United States Patent

McGregor

[15] 3,680,201

[45] Aug. 1, 1972

[54] PROCESS FOR BRAZING ZIRCONIUM ALLOY ELEMENTS

[72] Inventor: Gavin McGregor, Port Hope, Ontario, Canada

[73] Assignee: Westinghouse Canada Limited-Westinghouse Canada Limitee

[22] Filed: Feb. 13, 1969

[21] Appl. No.: 798,939

[30] Foreign Application Priority Data

Feb. 15, 1968 Canada............................012490

[52] U.S. Cl. .........................29/502, 29/191, 176/81
[51] Int. Cl. ..............................................B23k 33/00
[58] Field of Search......................29/191–193.5, 500, 29/502; 176/81

[56] References Cited

UNITED STATES PATENTS

| | | | |
|---|---|---|---|
| 2,146,823 | 2/1939 | Karmazin | 29/502 X |
| 2,424,522 | 7/1947 | Wasserman | 29/500 X |
| 2,568,242 | 9/1951 | Matteson, Jr. | 29/502 X |
| 3,345,267 | 10/1967 | Nazzer et al. | 176/81 X |
| 3,389,057 | 6/1968 | McGregor et al. | 176/81 X |
| 3,419,954 | 1/1969 | Brownlee | 29/500 X |

*Primary Examiner*—Allen B. Curtis
*Attorney*—R. H. Fox

[57] ABSTRACT

Method of Joining a zirconium alloy spacer to a zirconium alloy tube by placing a quantity of beryllium at a point outside the joint between the tube and spacer and heating the tube and spacer to form a liquid eutectic with the zirconium alloy.

5 Claims, 5 Drawing Figures a b a b a b

PROCESS FOR BRAZING ZIRCONIUM ALLOY ELEMENTS

This invention relates to zirconium brazing processes and in particular to means of beryllium brazing small zirconium alloy components to larger zirconium alloy components.

In accordance with present practice, nuclear fuel elements are normally clad with zircaloy, an alloy of zirconium. In the assembly of nuclear fuel elements, it is necessary to space the elements apart with spacers which are small zircaloy components sometimes referred to as warts. Brazing such small components to the zirconium alloy tubing which is to contain the nuclear fuel, is at present a relatively time consuming operation because a number of such spacers must be brazed to each fuel element and a charge for a reactor may contain thousands of such spacers. It will be seen, therefore, that the cost of brazing spacers in place may represent a substantial sum.

The brazing alloy normally used is a compound of beryllium and zirconium of a form approximately Zr 5 w/o Be. This alloy flows at a temperature of about 1,030° C. and a very satisfactory braze can be obtained by tack welding a sheet or wire of alloy adjacent the side or underneath the component and then induction heating the fuel element together with the spacer until the alloy flows into the joint between the spacer and the tube. This process is quite satisfactory from a point of view of results. Good sound joints are produced but the forming and preplacing of the alloy is a very expensive operation making it impractical for high volume production.

As an alternate to this process, a technique has been developed in which a thin layer of beryllium is coated on the component to be joined, that is on the spacer, on the face which is to be brazed to the fuel element. The spacer is then tack welded to the fuel element and the combination heated to brazing temperature. At the eutectic temperature the beryllium alloys with the zirconium, that is about 980° C. If heating now continues to flow temperature of 1,030°, the alloy produced tends to fill the space between the spacer and the fuel element.

There are, however, disadvantages to this process. First, in order that the space between the spacer and the fuel element be completely filled, the fuel element and spacer must be a good fit. Slight misalignment or bad fit can result in incomplete joints or joints with internal voids. Tack welding the elements in place when beryllium has been plated on their face also produces certain problems since beryllium is a good electrical conductor. The high current density is necessary to cause spot welding also tend to cause expulsion of material from the fuel element tube. Additionally the formation of the alloy requires the solution of the zirconium in the beryllium and this may cause undue penetration of the braze since part of the zirconium must come from the fuel element tube. The resulting thinning of the tube may be detrimental causing weakening of the fuel element at the point of the spacer.

The solution to all the foregoing problems is provided by the present invention by placing the beryllium at a point outside the joint between the spacer and the fuel element tube, tack welding the spacer to the fuel element tube and heating to permit the beryllium to flow from its original location to a space underneath the spacer. The flowing occurs however only after the beryllium has alloyed with the zirconium. Thus the extraction of zirconium is from the spacer rather than from the tube. Since the beryllium is not in the joint originally, tack welding of the spacer to the zirconium alloy tube is more convenient. Certain other advantages occur when locating the beryllium at places other than on the face of the spacer which is to bear against the fuel element tube.

A clearer understanding may be had from a consideration of the following specification and drawing, in which.

Figure 1:
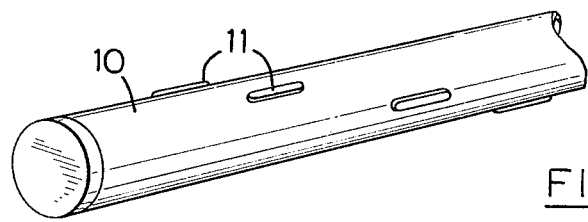
FIG. 1 is a perspective view of a nuclear fuel element.

Considering now FIG. 1, there is shown a zirconium alloy fuel element consisting of a tube of zirconium alloy designated 10 having placed thereon a series of spacers 11. These spacers maintain the tube at the proper distance apart when arranged in bundles and because they are exposed to high temperature, high pressure water or similar coolant liquids, their connection to the fuel tube must be such as not to promote errosion due to faulty brazing and gaps between the spacer and the fuel element.

Figure 2:
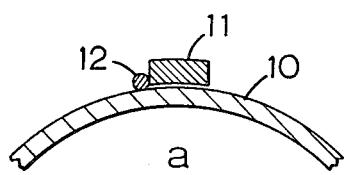
FIG. 2 is an illustration of the prior art.
Figure 2:
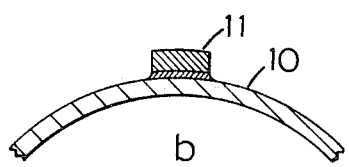

Considering FIG. 2 at *a* it will be seen that in accordance with the prior art it was usual practice to tack weld a spacer 11 to tube 10 and further position, by welding for example, a small wire of beryllium zirconium alloy designated 12 at one side of the spacer. The assembly was then placed in a vacuum and heated until the alloy member 12 became a liquid and flowed under the spacer by means of capillary action, filling the space between the spacer and the tube. The final result is shown at *b* in FIG. 2.

It will be seen that the alloy has flowed evenly to fill the space and produced a good joint with well formed fillets. The result is a very satisfactory joint but is expensive to produce due to the expense of placing alloy elements.

Figure 3:
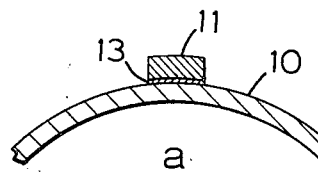
FIG. 3 is an illustration of the prior art.
Figure 3:
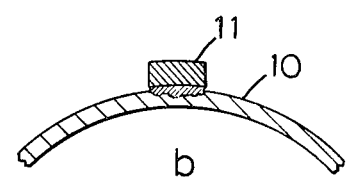

At *a* in FIG. 3 can be seen an alternative arrangement which has been used where the element 11 has been coated on its face with a layer of beryllium designated 13. After heating, the result is shown at *b* in FIG. 3. The space between the element 11 and the tube 10 is shown filled with alloy but it will be noticed that the alloy intrudes into the wall thickness of the tube thus reducing the effective wall thickness and weakening the tube since the beryllium zirconium alloy is not as strong as the original zirconium alloy used for producing the tube. Here also it will be noticed that there is usually an insufficient amount of beryllium zirconium alloy to completely fill the space. The base of the braze is not well filled, the fillets tend to be incomplete producing crevices or spaces which will promote corrosion in the presence of high temperature fluids.

Figure 4:
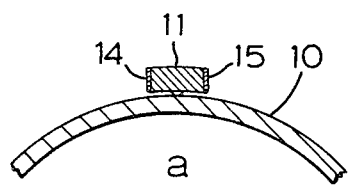
FIG. 4 is an illustration of the spacer in accordance with this invention.
Figure 4:
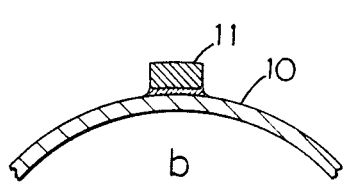
Figure 5:
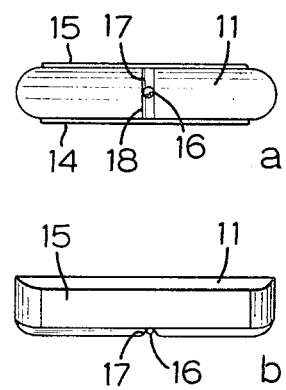
FIG. 5 is a further illustration of the spacer in greater detail.
Figure 5:
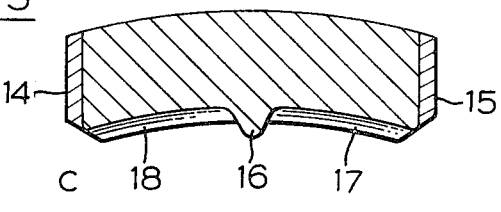

At *a* in FIG. 4 and in FIG. 5 will be seen the spacer in accordance with this invention. The spacer 11 is coated with beryllium on both its dies. These coatings are designated 14 and 15.

As will be seen, the spacer 11 is tack welded to the tube 10 and in order to facilitate this, a small protrusion is formed in the spacer as shown more clearly at $c$ in FIG. 5. The protrusion is designated 16. If the element together with its spacer is now placed in a vacuum and raised to brazing temperature, the beryllium alloys with the zirconium in the spacer forms a liquid brazing alloy which runs underneath the spacer and fills in the space due to capillary action and as may be seen at $b$ in FIG. 4, forms a very satisfactory braze completely filling the space between the spacer 11 and the tube 10 and producing a good smooth fillet at the edges.

Because the alloy is formed at the sides of the spacer before it flows into space, there is no alloying of the zirconium in the tube 10 with the beryllium and all the extraction of the zirconium from the components occurs along the side faces of the spacer 11.

As will be seen at $c$ in FIG. 5, the spacer 11 is curved to conform with the curvature of the tube 10. The sides are coated with beryllium at 14 and 15. The underside is shaped to produce a pair of channels 17 and 18 and a protrusion 16. The protrusion 16 facilitates spot welding the component on to the tube and the channel 17 and 18 assist in guiding the alloy into the center of the joint and ensuring an even distribution of the alloy. The beryllium in finely divided form is a very dangerous material and the processing of the spacers should be performed in such a way to minimize the production of finely divided beryllium.

In the spacers shown in FIG. 3, the common practice was to produce strips of zircaloy, face coat the zircaloy with beryllium and then punch out the spacers. The result was a wastage of beryllium and also an undesirable production of finely divided beryllium during the punching process which has to be carried on in a strictly controlled area to avoid inhallation of the dust.

In accordance with our invention, this problem is largely overcome. The spacers 11 are produced from wire by a simple process of cropping off lengths of the wire and then coining to produce the channel 17 and 18 and protrusion 16 and the desired curvature, the wire initially being a wire of relatively rectangular cross-section. The whole cropping and coining operation can be performed by a single progressive die operation with a wire input at one end and an output of shaped spacers from the other. The spacers are then stacked with their edges exposed in suitable frames which merely hold the spacers by their ends. The stacks of spacers are then placed in a vacuum chamber where stacks can be arranged radially around a common center in a form which may be described as a carousel and in this way all the stacks and spacers are equidistance from the center, at which point beryllium is vaporized. The vapor deposition of beryllium which is well known practice, takes place in the vacuum chamber and a great many spacers may be treated simultaneously.

There is no further machining of the spacers after the coating with the beryllium and hence there is no danger of production of finely divided beryllium.

It will be seen that this mode of production yields a very real advantage by reducing the danger of exposure of workmen to beryllium powders.

It will also be seen that the edges of the spacer 11 have been chamfered at their lower outer corners. As has been indicated, the flow of the alloy into the joint between the spacer and the tube is by virtue of capillary action and it will be apparent that sharp edges may be detrimental to such flow. Experience has shown that an improved flow of alloy may be produced if the lower edge of the spacer at the joint is not sharp.

The embodiments of the invention in which an exclusive property or privilege is claimed are defined as follows:

1. A method of joining a zirconium alloy spacer element to a zirconium alloy tube comprising depositing a quantity of beryllium on the side walls of said spacer while leaving its face free of beryllium, arranging said spacer with its face contiguous to the surface of said tube, heating the spacer and tube to a temperature sufficient to permit said beryllium to alloy with a portion of the zirconium in said spacer to form a liquid eutectic and continuing to heat said spacer and tube until the beryllium zirconium alloy so formed runs from the surface of the spacer where it was formed to the space between the tube and the face of the spacer where, upon cooling, it forms a bond between the spacer and the tube.

2. The method of claim 1 wherein the heating process is carried out in a vacuum.

3. The method of claim 1 wherein the spacer when arranged contiguous to the surface of the tube is maintained there, by spot welding the spacer to the tube.

4. The method of claim 3 wherein the face of the spacer is provided with a protrusion near its center to assist in spot welding the spacer to the tube.

5. The method of claim 1 wherein the face of the spacer is provided with channels to assist the flow of alloy into the space between the tube and the face of the spacer.

* * * * *